United States Patent [19]

Stires, III

[11] 4,074,275

[45] Feb. 14, 1978

[54] STRIP CHART RECORDER

[76] Inventor: John C. Stires, III, Box 988, Rancho Santa Fe, Calif. 92067

[21] Appl. No.: 765,600

[22] Filed: Feb. 4, 1977

[51] Int. Cl.² .............................................. G01D 9/12
[52] U.S. Cl. ................................ 346/19; 346/33 TP; 346/41; 346/136
[58] Field of Search ................. 346/33 TP, 49, 50, 61, 346/136, 41, 19, 25

[56] References Cited

U.S. PATENT DOCUMENTS

| | | | |
|---|---|---|---|
| 2,029,029 | 1/1936 | Koester | 346/25 |
| 3,787,885 | 1/1974 | Johnson | 346/136 |
| 3,868,697 | 2/1975 | Schefe | 346/33 TP X |

Primary Examiner—Joseph W. Hartary

[57] ABSTRACT

A portable strip chart recorder includes a programmable electronic drive circuit to drive an electric motor and a means for identifying the strip chart as having been recorded on a specific recorder, said strip chart incorporating graphic means of identifying the time interval programmed by the electronic drive circuit with points for identifying which specific time interval has been selected. The case of the recorder consisting of a base and a top having a self-locking hatch. The hatch in the top provides access for the operator to actuate electric switches which program the drive circuit to move the strip chart at a selected rate versus time. The surface over which the strip chart moves has an identifying number, or symbol, which can be reproduced on the chart by applying friction or heat. The hatch in the top of the case in self-locking and when closed operates an electric switch to close the battery-operated circuit.

3 Claims, 7 Drawing Figures

U.S. Patent  Feb. 14, 1978  4,074,275
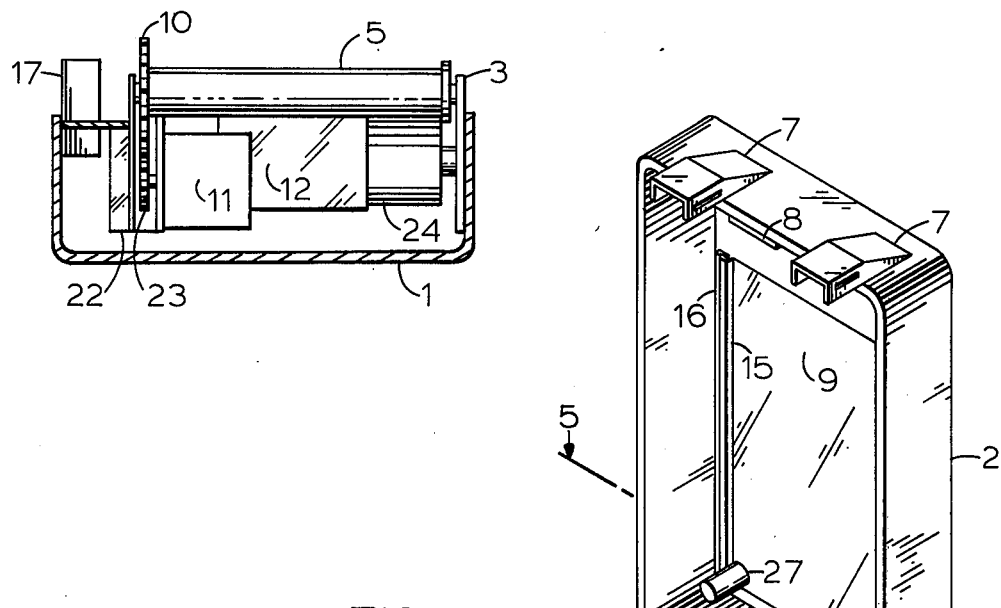
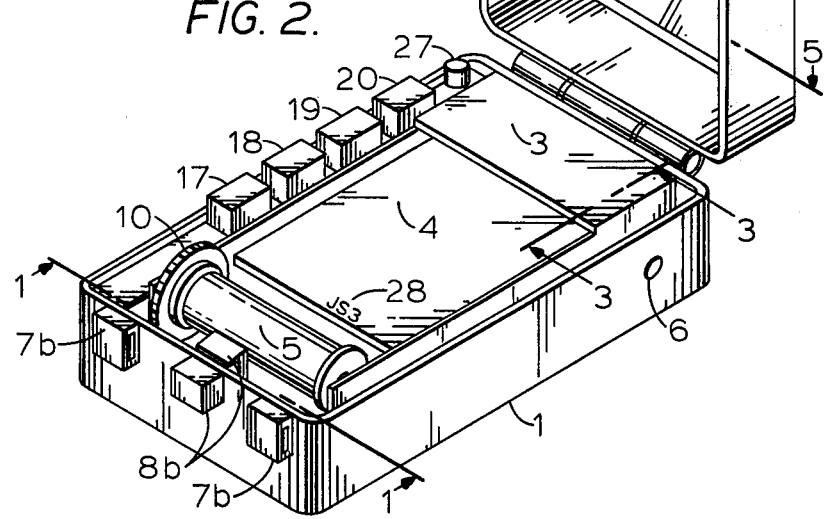
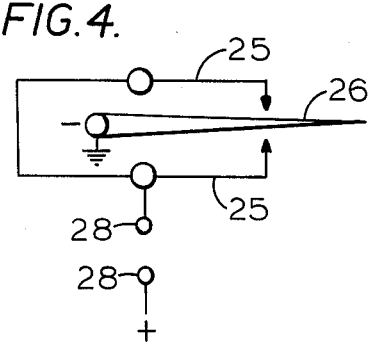
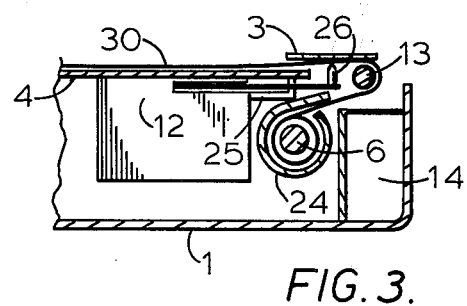

STRIP CHART RECORDER

BACKGROUND OF THE INVENTION

The present invention relates to a recording device that incorporates a moving recording chart therein, wherein selected information is permanently recorded on the chart as a function of elapsed time. The elapsed time can be programmed for preselected intervals and the chart, pre-printed with these intervals, provides points at which a mark can be made identifying the time interval selected. The recording device having a means of marking the chart used so as to relate the chart to specific recording device. In addition to producing the required information as a function of time, the recording device will supply a warning signal when preselected values of the information being recorded are exceeded.

The present invention has particular application in recorders that are intended to be easily transportable for use in transit shipments and at remote, unattended locations.

DESCRIPTION OF THE PRIOR ART

Prior to the instant invention, recorders have been designed to record temperature, shock, vibration, particle counts and radiation flux in the containers used to ship produce, delicate apparatus, photographic film and chemicals. These chart recorders are intended to produce a record of the variations in the variable being monitored as a function of elapsed time. Chart recorders heretofore employed have utilized a moving stylus to write on a chart moving continuously at a fixed rate of speed. Thus a recording of a short time interval is compressed into a small portion of the chart, the remainder of the chart being unused. This compression of the record reduces the resolution of the writing whereas if the complete length of the available chart had been used, the resolution would be greatly increased. Prior art recorders have no provision for identifying the chart as having been recorded on a specific recorder, nor do they have provisions for providing a warning signal when preselected limits of the vairable being measured have been reached or exceeded. Charts in prior art recorders do not provide graphic means of identifying the time intervals recorded as they are related to the time intervals programmed by the operator with points for identifying which specific time interval has been selected.

When perishable goods are shipped in a temperature controlled container such as a refrigerated railway car, truck, ship, or aircraft, it is essential that not only an accurate record of the temperature versus time profile be provided for the parties involved, but also that the time versus the temperature record be identified as having been recorded on a specific recorder. Furthermore, a timely warning of unacceptable temperatures in the container might save the shipment from a prolonged unacceptable temperature environment. Temperature versus time charts, when properly identified as to event, are used as evidence in the civil litigation arising from the failure of the carrier to maintain the proper temperatures in the container.

SUMMARY OF THE INVENTION

The recording device embodied in the present invention may include one or more styli or printing devices to write selected information on a chart that is moving continually. The rate of movement of the chart is controlled by an electronic clock circuit driving an electric motor capable of responding to pulses of fixed length and repitition rate or to a continuous electric signal. The output from the electronic clock driving circuit can be programmed for any selected rate of chart take-up speed. The writing styli, or printing devices can be of any type that will write on the chart material, i.e., pressure sensitive material, thermo-sensitive material, or by inking pens. Adjustable electrical contacts are provided to actuate an electric alarm circuit when the moving styli reach preselected limits. At a convenient location on the surface over which the chart material moves, a serial number or other symbol embossed or engraved on the surface will enable the chart to be marked with the identifying symbol, thus relating the chart to a specific recording device.

Accordingly, it is an object of the present invention to provide a recording device that provides a written record on a chart material which moves at a preselected rate of movement versus elapsed time.

Still another object of this invention is to provide a chart with graphic means of identifying the time intervals recorded as they are related to the time intervals programmed by the electronic drive circuit with points for identifying which specific time interval has been selected.

Still another object of this invention is to identify the chart record as having been recorded on a specific recording device.

DESCRIPTION OF THE DRAWINGS

FIG. 1 is a transverse section taken along the line 1—1 of FIG. 2;

FIG. 2 is an isometric of a portable chart recorder embodying the principles of the invention;

FIG. 3 is a section taken along the line 2—2 of FIG. 2;

FIG. 4 is a block diagram of the electronic control system;

DESCRIPTION OF THE PREFERRED EMBODIMENTS

Figure 6:
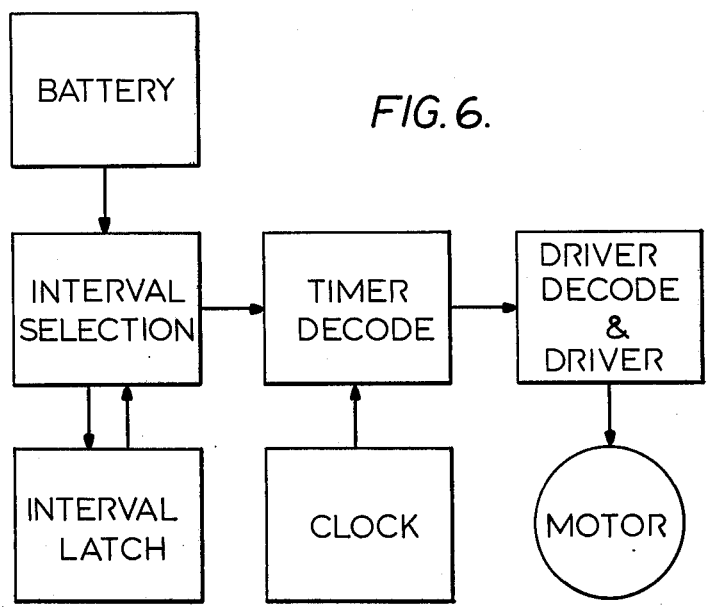
FIG. 6 is a section taken along the line 3—3 of FIG. 2.

As shown in FIG. 2 the portable chart recorder of this invention employs a case 1, with a cover 2, the cover 2 having a hatch 9, with a self-locking mechanism 15, as best shown in FIG. 6, a strip chart driving means 10, for advancing the strip chart, switches 17, 18, 19, 20 for programming operating time increments, an interlocking switch 21, and an actuating post 27 located on hatch 9 to actuate switch 21.

As is well understood in the art of portable instruments of this type, the case 1, is relatively small, approximately 6 inches by 3 inches by 2 inches. The case is of mechanically strong, shock-resistant material. The cover 2, is hinged to the case 1, and is provided with latch mechanisms 7 and 8 and the access hatch 9.

The latch mechanism 7 is provided with mating slots 7a and 7b to receive a wire or other sealing strip to lock the cover to the case for security against tampering. The latch 8, along with push-button catch 8a provides a method of keeping the instrument closed when sealing strip has been removed.

The driving means 10 includes a chart take-up spool 5 with an internal friction drive allowing the spool to be turned independent of the gear drive 10 by overcoming the friction drive. The gear 10 is driven through the geared output shaft of an electric motor 11.

In order to conserve the battery when the chart recorder is not in use, the interlocking switch 27 is located on access hatch 9, which is not closed until the operator is ready to install the instrument for recording. When the recorder has completed the preset recording interval, the operator removes the sealing strip, engages catch 8a and opens the instrument. He then removes the chart 30 from roller 5 by pulling on the chart thus overcoming the friction drive.

A unique feature of this invention is the electronic control circuit (as best shown in FIG. 4). This allows the operator to set infinitely variable time increments by means of rotary potentiometer (not shown) or in fixed increments by the use of the switches 17, 18, 19, 20. The circuit has a safety overide provision that sets the trip time increment to a pre-selected maximum time in the event the operator fails to operate a switch.

Figure 7:
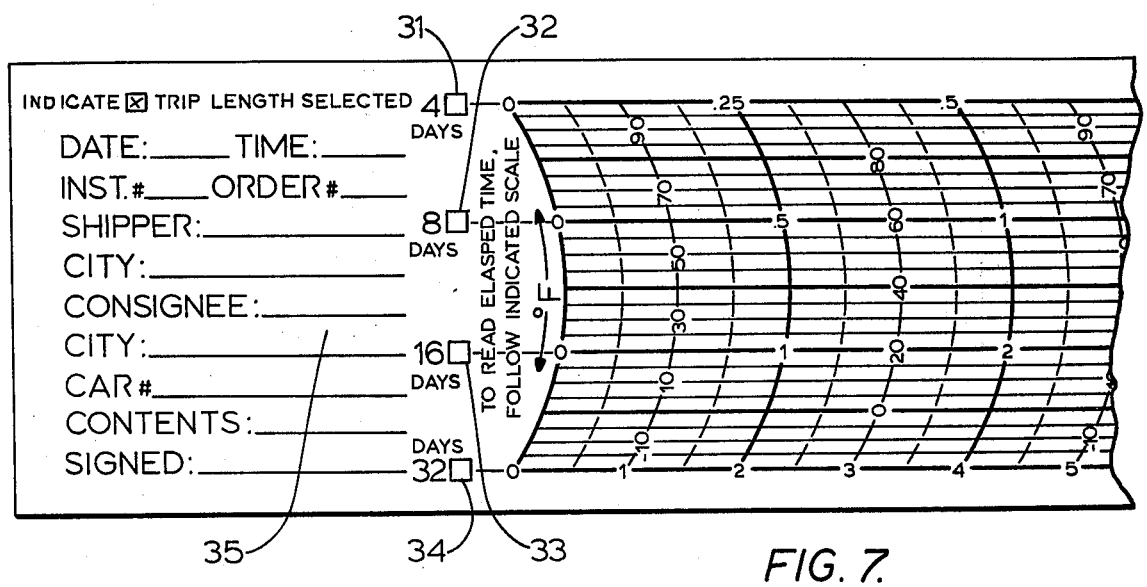
FIG. 7 is a facsimile of the strip chart.

Another unique feature of this invention is the use of a chart 30, incorporating graphic means of identifying the time intervals pre-selected by actuating any one of the switches 17, 18, 19, 20 (as best shown in FIG. 7), and providing points 31, 32, 33, 34, on the chart to indicate which of the intervals has been selected.

Figure 5:
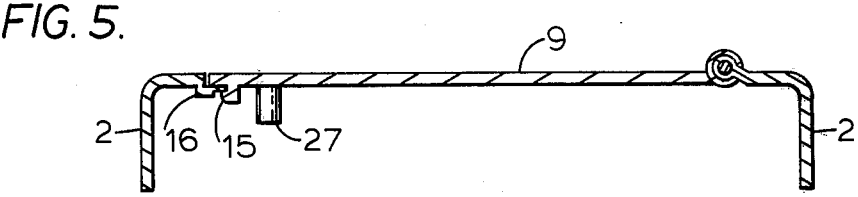
FIG. 5 is a schematic circuit diagram of the alarm actuating system.

Another unique feature of this invention is the use of adjustable electrical contacts 25 to close an electrical circuit through the stylus 26 (as best shown in FIG. 5). Access hole 6 is provided to allow electric wiring of an external alarm system.

Another unique feature of this invention is the use of an embossed identification symbol 28, or number on the surface 4 over which the chart passes. Friction or pressure such as the use of a soft roller, applied to the chart over the embossed symbol will reproduce the symbol on the chart. Writing surface 3 is of a hard smooth material to offer the minimum of friction to the passage of the chart and to the movement of the stylus.

In the operation of this invention a chart 30 is loaded into chart holder 24 and attached to take up spool 5, while a battery is placed in battery holder 14. The instrument is then closed and latched 8, 8a, and a sealing strip is placed through latching mechanisms 7 and 7a. The self-latching access hatch 9 is left ajar and is sent to the operator in this condition. To initialize the instrument, the operator selects the chart speed desired through use of one of the switches 17, 18, 19, 20 or through the use of an optional potentiometer (not shown). The operator then applies pressure or friction through the chart over the embossed identification number or symbol 28. The operator then identifies the time interval for the recording period by marking the chart at one of several points 31, 32, 33, 34 corresponding to the time period selected. The operator then fills in the chart with data pertinent to the specific recording in spaces provided, 35. The operator then closes the access hatch 9 which engages the self-latching mechanism on the latch 15, with the corresponding mechanism in the cover 16. This also engages the actuating switch 26 with the actuating post 27 in the hatch 9. The instrument is then recording data, and will operate for the time period specified by the operator. Should the operator desire to utilize the external alarm feature, FIG. 5, he would wire the alarm to the electrical contacts 25 through the access hole 6.

I claim:

1. A case having a top with a door having a self-locking mechanism, a container in said case for holding a strip chart, a drive means in said case for advancing said chart, the drive means capable of being programmed for specific rates of movement versus time, a battery circuit for powering said drive means, a means for selecting the rate of chart movement, a transducer for sensing an environmental variable, a means for printing or writing the output from the transducer on said strip chart, a switch means for closing the battery circuit only when the door in the top of the case is closed, the case having a surface over which the chart moves, said surface having an identifying number or symbol which can be reproduced on the strip chart by applying pressure to that portion of the strip chart over said symbol or number, said strip chart having graphic means of identifying the time intervals recorded as they are related to the time interval programmed, said chart having several points to be marked for identifying which specific time interval has been selected.

2. A case having a top with a door having a self-locking mechanism, a container in said case for holding a strip chart, a drive means in said case for advancing said chart, an electronic clock controlling the drive means, said electronic clock capable of being programmed for various rates of movement of the strip chart as a function of time, a battery circuit powering said drive means, a means for selecting the rate of chart movement, a transducer for sensing an environmental variable, said transducer having a thermal printing means for printing an analog record of the transducer output, a means for closing the battery circuit only when the door in the top of the case is closed, the case having a surface over which the chart moves, said surface having a symbol or number embossed or raised letters and/or numbers capable of reproducing said symbol or numbers by applying pressure or heat to that portion of the strip chart over the type, said strip chart having graphic means of identifying the time intervals recorded as they are related to the time interval programmed, said chart having several points to be marked for identifying which specific time interval has been selected.

3. A case having a top with a door having a self-locking mechanism, a container in said case for holding a strip chart, a drive means consisting of an electronic clock, an electronic circuit for driving an electric motor at programmable speeds, said programming being controlled by electric switches or a potentiometer, a battery circuit powering said drive means, a transducer for sensing an environmental variable, said transducer having a stylus for writing on pressure sensitive strip chart material, a means for closing the battery circuit only when the top of the case and the door in the top of the of the case is closed and locked, said case having a surface over which the strip chart moves, said surface having a means for reproducing a serial number or symbol on the strip chart by applying pressure on the strip chart portion that is over the serial number or symbol.

* * * * *